United States Patent
Zhao et al.

(10) Patent No.: US 11,521,113 B2
(45) Date of Patent: Dec. 6, 2022

(54) SYSTEM AND METHOD FOR UNIFYING HETEROGENOUS DATASETS USING PRIMITIVES

(71) Applicant: THE REGENTS OF THE UNIVERSITY OF MICHIGAN, Ann Arbor, MI (US)

(72) Inventors: Ding Zhao, Dearborn, MI (US); Jiacheng Zhu, Dearborn, MI (US); Wenshuo Wang, Dearborn, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 905 days.

(21) Appl. No.: 16/384,108

(22) Filed: Apr. 15, 2019

(65) Prior Publication Data

US 2020/0193324 A1    Jun. 18, 2020

Related U.S. Application Data

(60) Provisional application No. 62/779,630, filed on Dec. 14, 2018.

(51) Int. Cl.
*G06N 20/00* (2019.01)
*G06F 16/28* (2019.01)
(Continued)

(52) U.S. Cl.
CPC ........... *G06N 20/00* (2019.01); *G05D 1/0088* (2013.01); *G06F 16/2282* (2019.01);
(Continued)

(58) Field of Classification Search
CPC ...... G06N 20/00; G06N 7/005; G05D 1/0088; G06F 16/2282; G06F 16/2462; G06F 16/285; G01C 21/26; G08G 1/0125
See application file for complete search history.

(56) References Cited

U.S. PATENT DOCUMENTS

| 5,922,041 A * | 7/1999 | Anderson | ............. G01C 25/00 |
| | | | 701/521 |
| 2007/0152804 A1* | 7/2007 | Breed | ..................... G01S 19/17 |
| | | | 701/301 |

(Continued)

OTHER PUBLICATIONS

Appenzeller, "The Scientists' Apprentice," Science, vol. 357, Issue 6346, pp. 16-17 (2017).

(Continued)

*Primary Examiner* — Richard M Camby
(74) *Attorney, Agent, or Firm* — Christopher G. Darrow; Darrow Mustafa PC (57) ABSTRACT

In one embodiment, example systems and methods related to a manner of unifying heterogeneous datasets are provided. Multiple heterogeneous datasets containing traffic or driving data are collected. The records of the datasets are combined, and the records in the combined dataset are ordered into a plurality of time series based on timestamps associated with each record. A Bayesian learning method, such as hidden Markov models, is used to identify traffic primitives in the datasets. Each traffic primitive may include several consecutive records in the combined dataset and may correspond to particular driving actions such as turning left or right, stopping, accelerating, etc. The traffic primitives are used to create a traffic primitive index that can be queried by users or researchers for specific records. These records can be used to train or test one or more learning-based algorithms. In addition, the combined dataset can be further divided into tables corresponding to particular sensors, allowing the users or researchers to query for specific traffic primitive and sensor combinations.

20 Claims, 4 Drawing Sheets

(51) Int. Cl.
*G06F 16/22* (2019.01)
*G06F 16/2458* (2019.01)
*G05D 1/00* (2006.01)
*G06N 7/00* (2006.01)

(52) U.S. Cl.
CPC ........ *G06F 16/2462* (2019.01); *G06F 16/285* (2019.01); *G06N 7/005* (2013.01)

(56) References Cited

U.S. PATENT DOCUMENTS

2019/0361439 A1* 11/2019 Zeng ................ G06V 10/82
2020/0139973 A1* 5/2020 Palanisamy ............ G08G 1/167

OTHER PUBLICATIONS

Zhao et al., "TrafficNet: An Open Naturalistic Driving Scenario Library," arXiv:1708.01872v1 [cs.CY] Aug. 1, 2017.
Yin and Berger, "When to use what data set for your self-driving car algorithm: An overview of publicly available driving datasets," 2017 IEEE 20th International Conference on Intelligent Transportation Systems, 8 pages (2017).
Wang et al., "How Much Data is Enough? A Statistical Approach with Case Study on Longitudinal Driving Behavior," arXiv:1706.07637v1 [cs.LG] Jun. 23, 2017.
Geiger et al., "Vision meets robotics: The KITTI dataset," The International Journal of Robotics Research, vol. 32, Issue 11, pp. 1231-1237 (2013).
Pandey et al., "Ford Campus Vision and Lidar Data Set," The International Journal of Robotics Research, pp. 1-6 (2011).
Hull et al., "CarTel: A Distributed Mobile Sensor Computing System," SenSys '06, 14 pages (2006).
Bezzina & Sayer, "Safety pilot model deployment: Test conductor team report," Report No. DOT HS 812 171, Washington, DC: National Highway Traffic Safety Administration, pp. 1-142 (2015).
Pese et al., "CarLab: Framework for Vehicular Data Collection and Processing," ACM CarSys'17, Snowbird, Utah, USA, 6 pages (2017).
Soroush et al., "DOME: A Diverse Outdoor Mobile Testbed," ACM HotPlanet '09 Krakow, Poland, 6 pages (2009).
Wang and Zhao, "Extracting Traffic Primities Directly from Naturalistically Logged Data for Self-Driving Applications," arXiv:1709.03553v3 [cs.CV] May 26, 2018.
Bender et al., "An Unsupervised Approach for Inferring Driver Behavior From Naturalistic Driving Data," IEEE Transactions on Intelligent Transportation Systems, vol. 16, Issue 6, pp. 3325-3336, 2015 (Abstract).
Taniguchi et al., "Unsupervised Hierarchial Modeling of Driving Behavior and Prediction of Contextual Changing Points," IEEE Transactions on Intelligent Transportation Systems, pp. 1-16 (2014).
Taniguchi et al., "Sequence Prediction of Driving Behavior Using Double Articulation Analyzer," IEEE Transactions on Systems, Man, and Cybernetics: Systems, vol. 46, Issue 9, pp. 1300-1313, 2016 (Abstract).
Hamada et al., "Modeling and Prediction of Driving Behaviors Using a Nonparametric Bayesian Method with AR Models," IEEE Transactions on Intelligent Vehicles, vol. 1, Issue 2, pp. 131-138, 2016 (Abstract).
Wang et al., "Driving Style Analysis Using Primitive Driving Patterns with Bayesian Nonparametric Approaches," arXiv:1708.08986v1 [cs.CV] Aug. 16, 2017.
Donoso et al., "Foundations of human reasoning in the prefrontal cortex," Science Mag, pp. 1-10 (2014).
Fox et al., "Bayesian Nonparametric Inference of Switching Dynamic Linear Models," IEEE Transactions on Signal Processing, pp. 1-32 (2010).
Ryden, "EM versus Markov chain Monte Carlo for Estimation of Hidden Markov Models: A Computational Perspective," Bayesian Analysis, vol. 3, No. 4, pp. 659-688 (2008).
Mahboubi & Kochenderfer, "Learning Traffic Patterns at Small Airports From Flight Tracks," IEEE Transactions an Intelligent Transportation Systems, vol. 18, Issue 4, pp. 917-926, 2017 (Abstract).

* cited by examiner

SYSTEM AND METHOD FOR UNIFYING HETEROGENOUS DATASETS USING PRIMITIVES

CROSS-REFERENCE TO RELATED APPLICATIONS

This application claims priority to U.S. Provisional Patent Application Ser. No. 62/779,630 titled "UNIFICATION ALGORITHMS TO LINK AUTOMOTIVE DATABASES" and filed on Dec. 14, 2018. The disclosure of which is hereby incorporated by reference in its entirety.

TECHNICAL FIELD

The subject matter described herein relates, in general, to systems and methods for unifying heterogeneous datasets, and, in particular, to applying Bayesian learning methods to identify traffic primitives across records of multiple heterogeneous datasets and allowing users to access the records associated with the traffic primitives.

BACKGROUND

The last decade has witnessed a dramatic growth in autonomous vehicles with many learning-based algorithms and techniques in terms of decision-making, path-planning, and optimal control. High-quality naturalistic driving data is needed to test and evaluate these learning-based algorithms and techniques. Most existing traffic or driving datasets (also referred to herein as databases) are chronologically logged and organized and thus an extensive post-processing may be required for users to extract interested information. However, such post-processing is tedious may require the manual labeling of data. Accordingly, some users may avoid using such data, even though it would be beneficial to their learning-based algorithms.

Furthermore, because of differences between the data collected and organization systems used for each driving dataset, using multiple datasets to train or test a learning-based algorithm is difficult. For example, each dataset may be different due to diversity in driving settings and data collection platforms. Researchers usually collect driving data for a dataset using vehicles equipped with a custom set of sensors such as image sensors, LiDAR sensors, RADAR, GPS, IMU, etc. Each sensor may record data to the driving dataset in a specific format and with a specific frequency, all of which may lead to differences between two driving datasets, even for data with the same labels. These differences in the datasets may make combining the datasets difficult, and therefore may make it difficult for users to train or test their learning-based algorithms using multiple datasets.

SUMMARY

In one embodiment, example systems and methods related to a manner of unifying heterogeneous datasets are provided. Multiple heterogeneous datasets containing traffic or driving data are collected. The records of the datasets are combined, and the records in the combined dataset are ordered into a plurality of time series based on timestamps associated with each record. A Bayesian learning method, such as hidden Markov models, is used to identify traffic primitives in the datasets. Each traffic primitive may include several consecutive records in the combined dataset and may correspond to particular driving actions such as turning left or right, stopping, accelerating, etc. The traffic primitives are used to create a traffic primitive index that can be queried by users or researchers for specific records. These records can be used to train or test one or more learning-based algorithms. In addition, the combined dataset can be further divided into tables corresponding to particular sensors, allowing the users or researchers to query for specific traffic primitive and sensor combinations.

In one embodiment, system for unifying heterogeneous datasets using traffic primitives is disclosed. The system includes one or more processors and a memory communicably coupled to the one or more processors. The memory stores a preprocessing module including instructions that when executed by the one or more processors cause the one or more processors to: receive a plurality of datasets, wherein each dataset is associated with a plurality of records, and each record is associated with a time and a sensor of a plurality of sensors; and combine the records of the received plurality of datasets into a combined dataset based on the time associated with each record. The memory stores an integration module including instructions that when executed by the one or more processors cause the one or more processors to: for each record of the combined dataset, add the record to a table of a plurality of tables based on the sensor associated with the record, wherein each table of the plurality of tables corresponds to a different sensor of the plurality of sensors. The memory stores a primitive module including instructions that when executed by the one or more processors cause the one or more processors to: for each table of the plurality of tables, segment the records of the table into a plurality of traffic primitives. The memory stores a query module including instructions that when executed by the one or more processors cause the one or more processors to: receive a query, the query identifying at least one traffic primitive of the plurality of traffic primitives; and in response to the query, provide records of each table corresponding to the at least one traffic primitive identified by the query.

In one embodiment, a method for unifying heterogeneous datasets using traffic primitives is provided. The method includes: receiving a plurality of datasets, wherein each dataset is associated with a plurality of records, and each record is associated with a time and a sensor of a plurality of sensors; combining the records of the received plurality of datasets into a combined data set based on the time associated with each record; for each record of the combined dataset, adding the record to a table of a plurality of tables based on the sensor associated with the record, wherein each table of the plurality of tables corresponds to a different sensor of the plurality of sensors; for each table of the plurality of tables, segmenting the records of the table into a plurality of traffic primitives; receiving a query, the query identifying at least one traffic primitive of the plurality of traffic primitives; in response to the query, providing records of each table corresponding to the traffic primitive identified by the query; and testing or training one or more learning-based algorithms using the provided records.

In one embodiment, a non-transitory computer-readable medium for unifying heterogeneous datasets using traffic primitives is provided. The medium including instructions that when executed by one or more processors cause the one or more processors to: receive a plurality of datasets, wherein each dataset is associated with a plurality of records, and each record is associated with a time and a sensor of a plurality of sensors; combine the records of the received plurality of datasets into a combined data set based on the time associated with each record; for each record of the combined dataset, add the record to a table of a plurality of tables based on the sensor associated with the record, wherein each table of the plurality of tables corresponds to a different sensor of the plurality of sensors; for each table of the plurality of tables, segment the records of the table into a plurality of traffic primitives; receive a query, the query identifying at least one traffic primitive of the plurality of traffic primitives; in response to the query, provide records of each table corresponding to the traffic primitive identified by the query; and test or train one or more learning-based algorithms using the provided records.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with unifying heterogeneous datasets are disclosed. As described above, autonomous vehicles such as the vehicle 100 of FIG. 1 frequently rely on learning-based algorithms to control autonomous functions such as navigation and collision avoidance. While such learning-based algorithms are useful, they require a large amount of traffic data (also referred herein to as driving data) collected by autonomous vehicles 100 for training or testing. While there are many publically available traffic datasets (e.g., KITTI, Ford, Udacity, CarLab, and CarTell), each traffic dataset may use a different format making using multiple datasets difficult. Furthermore, each traffic dataset may include data and records from different sets of sensors (e.g., the sensors of the sensor system 120), further complicating dataset combination.

Accordingly, in order to unify the various heterogeneous traffic datasets, a dataset unification system 170 is disclosed. As will be described further with respect to FIG. 2, the dataset unification system 170 unifies multiple traffic datasets using traffic primitives. The dataset unification system 170 combines the datasets into a combined dataset ordered into a plurality of time series based on timestamps associated with each record. The dataset unification system 170 then uses unsupervised learning techniques to determine a plurality of traffic primitives in the records of the combined dataset. These traffic primitives may be ordered sequences of records in the combined dataset that correspond to discrete autonomous vehicle 100 actions such as turning, accelerating, braking, etc. The determined traffic primitives can be clustered using statistical techniques to identify similar traffic primitives across the combined dataset.

Because of the unsupervised learning techniques, no prior knowledge about the determined traffic primitives is necessary by the dataset unification system 170. The determined traffic primitives can be used to generate an index, and the index may be used by the dataset unification system 170 to respond to queries for records and data related to particular traffic primitives. The records and data may then be used to train or test one or more learning-based algorithms.

The dataset unification system 170 described herein provides many advantages over the prior art of record. First, by combining multiple traffic datasets into a single searchable dataset, the amount of traffic data that can be used to train or test learning-based algorithms is greatly increased. Second, by using traffic primitives to categorize the records of the combined datasets, records from multiple datasets can be used to train or test learning-based algorithms even where the datasets use different sensor and record structures.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 1:
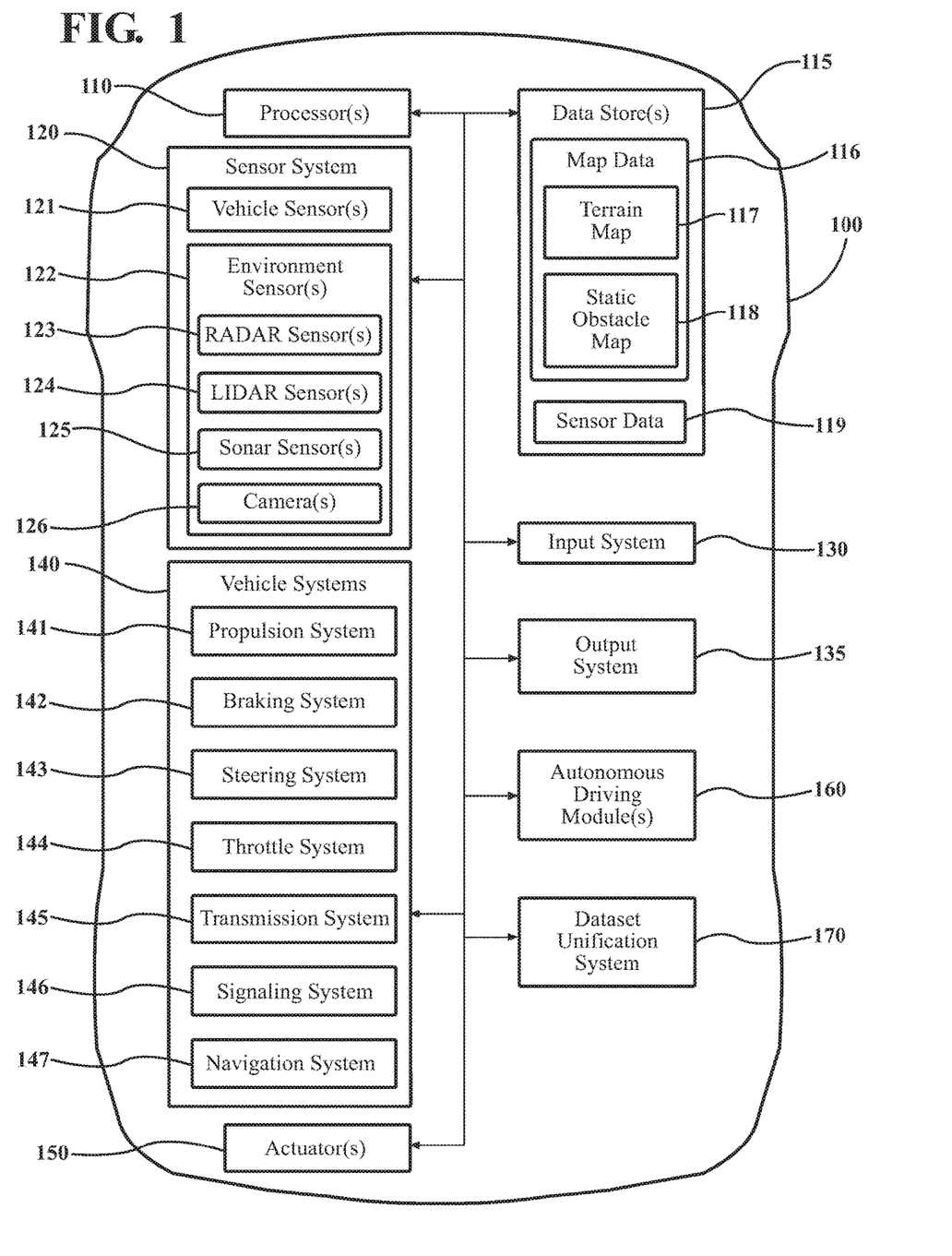
FIG. 1 illustrates one embodiment of a vehicle within which systems and methods disclosed herein may be implemented.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a dataset unification system 170 that is implemented to perform methods and other functions as disclosed herein relating to determining optimal paths for the vehicle 100. The noted functions and methods will become more apparent with a further discussion of the figures.

Figure 2:
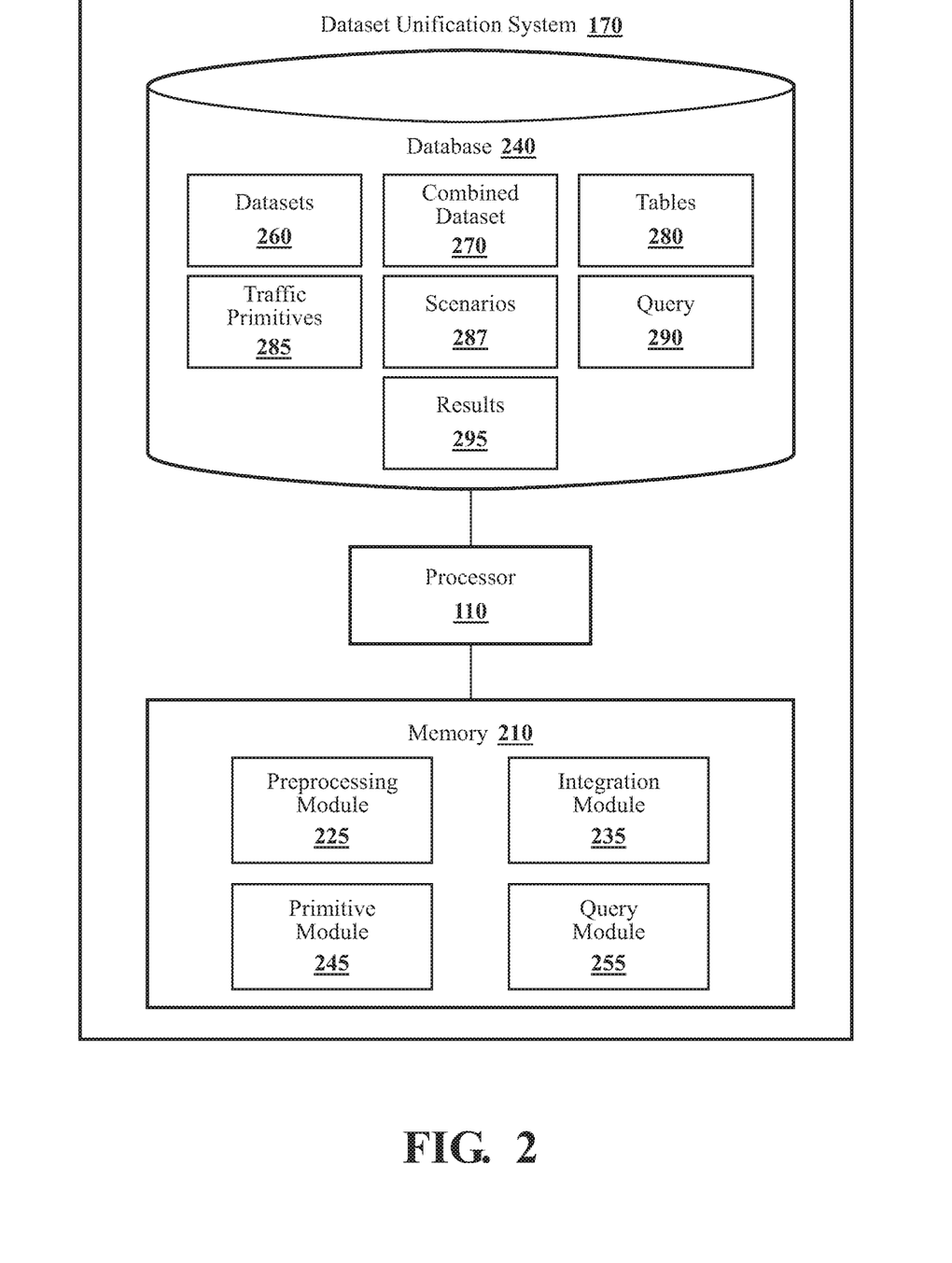
FIG. 2 illustrates one example of dataset unification system as embodied herein.

With reference to FIG. 2, one embodiment of the dataset unification system 170 of FIG. 1 is further illustrated. The dataset unification system 170 is shown as including a processor 110 from the vehicle 100 of FIG. 1. Accordingly, the processor 110 may be a part of the dataset unification system 170, the dataset unification system 170 may include a separate processor from the processor 110 of the vehicle 100 or the dataset unification system 170 may access the processor 110 through a data bus or another communication path. It should be appreciated, that while the dataset unification system 170 is illustrated as being a single contained system, in various embodiments, the dataset unification system 170 is a distributed system that is comprised of components that can be provided as a centralized server, a cloud-based service, and so on. Moreover, the dataset unification system 170 described herein is not limited to vehicle-based implementations, but may be implemented using any general purpose computing system.

In one embodiment, the dataset unification system 170 includes a memory 210 that stores a preprocessing module 225, an integration module 235, a primitive module 245, and a query module 255. More or fewer modules may be supported. The memory 210 is a random-access memory (RAM), read-only memory (ROM), a hard-disk drive, a flash memory, or other suitable memory for storing the modules 225, 235, 245, and 255. The modules 225, 235, 245, and 255 are, for example, computer-readable instructions that when executed by the processor 110 cause the processor 110 to perform the various functions disclosed herein. Moreover, as previously noted, in various embodiments, one or more aspects of the dataset unification system 170 are implemented as cloud-based services, and so on. Thus, one or more modules of the dataset unification system 170 may be located remotely from other components and may be implemented in a distributed manner.

Furthermore, in one embodiment, the dataset unification system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 225, 235, 245, and 255 in executing various functions. In one embodiment, the database 240 includes one or more datasets 260 along with, for example, other information that is used and/or generated by the modules 225, 235, 245, and 255 such as a combined dataset 270, one or more tables 280, one or more traffic primitives 285, one or more scenarios 287, a query 290, and results 295. Of course, in further embodiments, the various information may be stored within the memory 210 or another suitable location.

The preprocessing module 225 may receive a plurality of datasets 260, and may generate a combined dataset 270 from the plurality of datasets 260. Each dataset 260 may be a different traffic dataset and may include data gathered by one or more autonomous vehicles 100 while driving. Each dataset 260 may include data collected by one or more sensors of the autonomous vehicle 100. The sensors may include LiDAR sensors, image sensors, RADAR sensors, etc. Other types of sensors may be supported. The sensors may be part of the sensor system 120 described with respect to FIG. 1. Each dataset 260 may include a plurality of records. Depending on the embodiment, each record may also include a time or timestamp that indicates when the data in the record was generated.

Other types of data may also be included in each dataset 260. For example, the dataset 260 may include information about the autonomous vehicle 100 systems such as speed, gear, brake pressure, steering wheel position, and location. Such information may be provided by the vehicle systems 140 of the autonomous vehicle 100, for example.

As described above, each of the datasets 260 may include different data and may be generated using a different set of sensors. In order for the dataset unification system 170 to unify the various datasets 260, the preprocessing module 225 may first generate a combined dataset 270 that includes the records associated with each dataset 260.

While the records associated with each dataset 260 may be different, they all have in common a timestamp or time field that indicates when the data in the record was collected or generated. Accordingly, to create the combined dataset 270, the preprocessing module 225 may organize the records of the datasets 260 into what are referred to herein as "time series". A time series may be a sequence of records from a dataset 260 ordered by time. The number of records in a particular time series may be set by a user or administrator. A time series may represent all of the data (i.e., records) collected by an autonomous vehicle 100 in a single trip. Alternatively, a time series may represent some subset of the data collected by the autonomous vehicle 100 in a trip. For example, there may be multiple time series for a single autonomous vehicle trip.

The preprocessing module 225 may generate the combined dataset 270 by placing the records from the various time series created for each dataset 260 in order based on the timestamps associated with each record. Any method for generating a dataset or arranging or placing records of a dataset may be used.

The integration module 235 may further generate tables 280 from the time series data of the combined dataset 270. In one embodiment, each table 280 may include records from the combined dataset 270 for a particular sensor or type of sensor. For example, there may a table 280 that include records that were generated by LiDAR sensors, and there may be a table 280 that includes records that were generated by camera sensors. Each table 280 may correspond to all versions of a particular sensor (e.g., all LiDAR sensors), or to particular makes, models, or types of a particular sensor (e.g., LiDAR sensors made by a particular manufacturer or having a particular model number). The records in each table 280 may be organized based on the time stamps and time series associated with each record.

The primitive module 245 may divide the time series data from the tables 280 (or alternatively the combined dataset 270) into what are referred to herein as traffic primitives 285. A traffic primitive 285 may represent principle compositions of driving activity. Example primitives may include stopping, accelerating, etc. [INVENTORS—CAN YOU PROVIDE SOME MORE EXAMPLES OF PRIMITIVES]. A traffic primitive 285 may be associated with a time ordered sequence of records from one or more of the tables 280 and/or the combined dataset 270.

To determine the traffic primitives 285, in some implementations, the primitive module 245 may use an unsupervised learning approach. In particular, the primitive module 245 may determine the traffic primitives 285 using Bayesian learning such as hidden Markov models. In one embodiment, the primitive module 245 may use what is known as a sticky hierarchical Dirichlet process hidden Markov model (hereinafter "sticky HDP-HMM"). The particular implementation of sticky HDP-HMM will be described further below.

After generating the traffic primitives 285, the primitive module 245 may cluster and classify the traffic primitives 285. As may be appreciated, multiple traffic primitives 285 corresponding to the same vehicle actions such as turning left or braking may be identified by the primitive module 245. Accordingly, the primitive module 245 may cluster traffic primitives 285 determined by the primitive module 245 based on their statistical similarity. Any method for determining the statistical similarity of a traffic primitive 285 may be used.

In some embodiments, the primitive module 245 may further organize the determined traffic primitives into what are referred to herein as scenarios 287. A scenario 287 may represent a typical driver action that is made up of one or more traffic primitives 285. Examples of scenarios 287 may include changing lanes, entering an intersection, exiting an intersection, exiting a roadway, entering a roadway, merging into traffic, turning across traffic, parking, etc. For example, the scenario 287 of passing a vehicle may include traffic primitives 285 such as accelerating, steering to the left, accelerating, and steering to the right. Other scenarios 287 may be supported.

The primitive module 245 may determine scenarios 287 based on sequential traffic primitives 285 in the tables 280 and/or the combined dataset 270. Each scenario 287 may include traffic primitives 285 associated with the same time series. Depending on the implementation, the scenarios 287 may be determined automatically by the primitive module 245 using Bayesian learning. Alternatively or additionally, the scenarios 287 may be determined by a user or reviewer.

The query module 255 may generate a primitive index that identifies the records in the tables 280 and/or combined dataset 270 that correspond to each traffic primitive 285. In addition, the primitive index may further identify traffic primitives 285 that correspond to each scenario 287. Depending on the embodiment, the query module 255 may organize the primitive index, tables 280 and/or the combined dataset 270 as a relational database management system ("RDBMS"). Any type of RDBMS may be used.

The query module 255 may receive a query 290, and may use the primitive index to determine records that are responsive to the query 290. These responsive records may be returned as results 295 and may be used as input/training data to one or more learning-based algorithms. Depending on the embodiment, a query 290 may identify one or more traffic primitives 285 or scenarios 287. The query 290 may further identify a desired sensor or sensors. The desired sensors may be used to restrict the query 290 to records from tables 280 associated with the desired sensor or sensors.

For example, an engineer may have created a learning-based algorithm that makes decisions based on input from a LiDAR sensor and an image sensor (i.e., camera). The engineer would like to test the algorithm in scenarios where an autonomous vehicle 100 is turning. Accordingly, the engineer may create a query 290 that identifies the LiDAR sensor and image sensor, as well as the scenario 287 of turning. The engineer may provide the query 290 to the query module 255 of the dataset unification system 170.

The query module 255 may receive the query 290 and may use the primitive index to determine records corresponding to traffic primitives 285 associated with the identified scenario 287 of turning. Because the query 290 identified LiDAR and image sensors, the query module 255 may only retrieve records from the tables 280 associated with LiDAR sensors and image sensors. The query module 255 may provide the determined records to the engineer as the results 295. The engineer may then use the records from the results 295 to test or train their learning-based algorithm.

Now the sticky HDP-HMM used by the primitive module 245 to determine the traffic primitives 285 will be described further. The act of driving by the autonomous vehicle 100 may be treated as a logic combination of traffic primitives 285 and therefore the dynamic process among the traffic primitives 285 can be treated as a probabilistic process. In particular, traffic may be modeled as a dynamic process of traffic primitives 285 based on hidden Markov models ("HMM") which consist of two layers: a hidden layer and an observation layer. The hidden layer represents the traffic primitives 285 p and the observation layer represents the records of the tables 280 and/or the combined dataset 270.

Given the time series ordered records $O=\{O_t\}_{t=1}^T$ with $O \in \mathbb{R}^{d \times t}$, each traffic primitive 285 $p_t$ at time t may be subject to one record from O. The transition probability from traffic primitives $p_i$ to $p_j$ is denoted as $\pi_{ij}$, where $\pi_i = [\pi_{i,1}, \pi_{i,2}, \pi_{i,3} \ldots]$. The record $o_t$ at time t may be generated using the emission function $o_t = F(o_t | p_t)$. Accordingly, the HMM may be expressed as the following:

$$p_t | p_{t-1} \sim \pi_{t-1}$$

$$o_t | p_t \sim F(\emptyset_{p_t})$$

where $F(\bullet)$ is the emission function and $\emptyset_{p_t}$ is the emission parameter. Because the intrinsic dynamic of traffic is changing and open ended, the dimension of the parameter space regarding the hidden states in the model may be infinite. In order to represent infinite hidden states, a prior probability distribution on an infinite-dimensional space may be used by the primitive module 245. In particular, the sticky HDP-HMMM ($\gamma$, $\alpha$, H) is used by adding an extra parameter k>0.

Accordingly, the sticky HDP-HMM may be expressed as the following:

$$\beta | \gamma \sim GEM(\gamma)$$

$$\pi_i | \alpha, \beta, k \sim DP\left(\alpha + k, \frac{\alpha\beta + k\delta_i}{\alpha + k}\right), i = 1, 2, \ldots$$

$$x_t | x_{t-1} \sim \pi_{x_{t-1}}, t = 1, 2, \ldots T$$

$$y_t | x_t, \emptyset_{x_t} \sim F(\emptyset_{x_t}), t = 1, 2, \ldots T$$

$$\emptyset_i | H \sim H, i = 1, 2, \ldots$$

where T is the data length. In order to make the algorithm tractable for deriving all necessary expressions to perform inference, it may be assumed that observations are drawn from a Gaussian distribution with $\emptyset_i = [\mu_i, \sigma_i]$. As a result, if the priors for observation and translation distributions are learned correctly, the full-conditional posteriors can be learned correctly and the full-conditional posteriors can be computed by the primitive module 245 using the Gibbs sampling method, for example. Other sampling methods may be used.

Using the HDP-HMM based method described above, the primitive module 245 may determine a plurality of traffic primitives 285 from the time series ordered records of the tables 280 and/or the combined dataset 270. In addition, the HDP-HMM simultaneously clusters the traffic primitives 285 without having any knowledge of traffic primitives 285.

Figure 3:
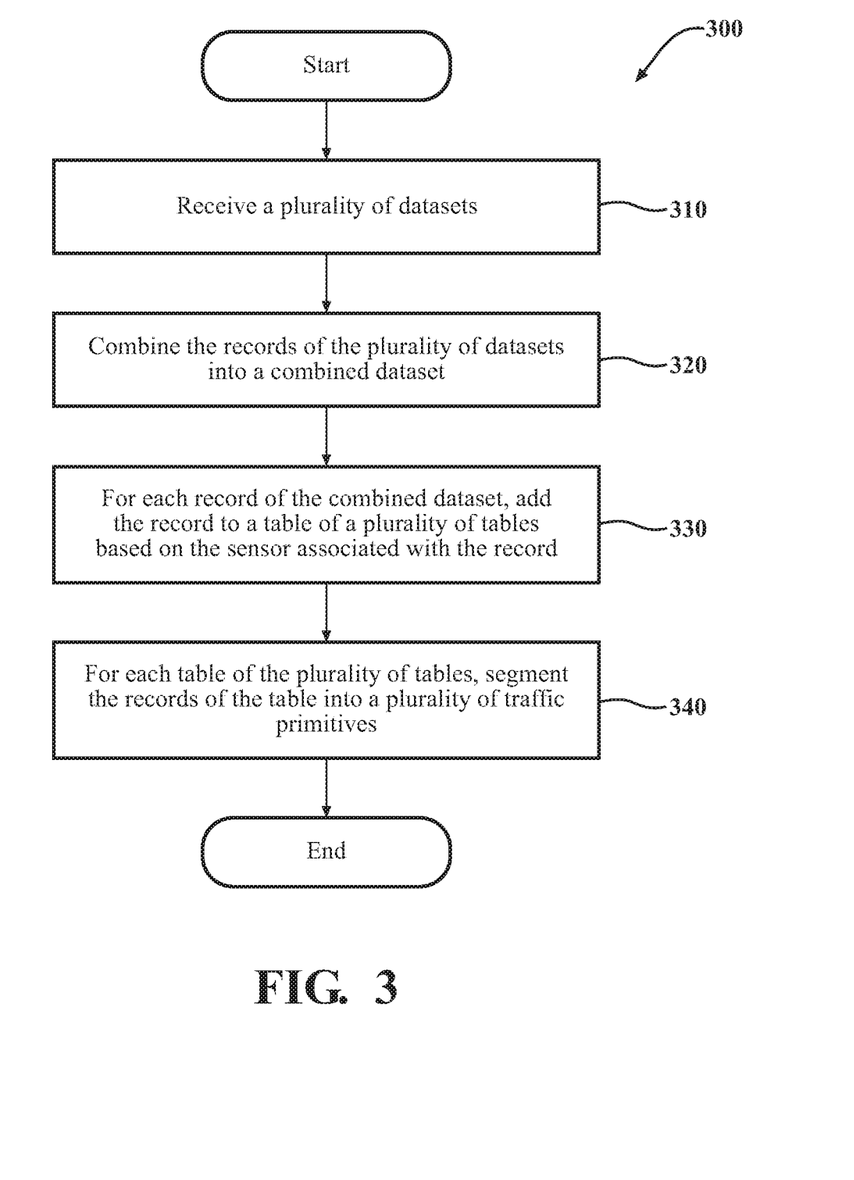
FIG. 3 illustrates a flowchart of a method that is associated with segmenting records from a plurality of traffic datasets into a plurality of traffic primitives.

Additional aspects of the dataset unification system 170 will be discussed in relation to FIG. 3. FIG. 3 illustrates a flowchart of a method 300 that is associated with segmenting records from a plurality of traffic datasets into a plurality of traffic primitives. The method 300 will be discussed from the perspective of the dataset unification system 170 of FIGS. 1 and 2. While the method 300 is discussed in combination with the dataset unification system 170, it should be appreciated that the method 300 is not limited to being implemented within the dataset unification system 170 but is instead one example of a system that may implement the method 300.

At 310, the preprocessing module 225 may receive a plurality of datasets 260. Each dataset 260 may be a traffic dataset 260 and may include data captured by sensors and vehicle systems of one or more autonomous vehicles 100.

For example, an autonomous vehicle 100 may generate a traffic dataset 260 by capturing the output of the one or more sensors and vehicle system. Each dataset 260 may include a plurality of records and each record may be associated with a time or timestamp. Because of difference between the autonomous vehicles 100, the particular sensors used, and the structure of the records of each dataset 260, training or teaching a learning-based algorithm using the different datasets 260 may be difficult.

At 320, the preprocessing module 225 may combine the records of each of the datasets 260 into a combined dataset 270. Depending on the embodiment, the preprocessing module 225 may combine the records based on the timestamps associated with each of the records. In particular, the preprocessing module 225 may, for each dataset 260, organize the records of the dataset 260 into a plurality of time series. As described above, a time series may be a sequence of records from a dataset 260 ordered by time. Each time series may correspond to a single trip by an autonomous vehicle 100 and may include all of the records generated for the sensors of the vehicle 100 during the trip. Alternatively, each time series may correspond to a particular section or portion of a trip of an autonomous vehicle 100. The preprocessing module 225 may combine the records of the datasets 260 into the combined dataset 270 according to the plurality of time series.

At 330, the integration module 235 may, for each record of the combined dataset 270, add the record to a table 280 of a plurality of tables 280 based on the sensor associated with the record. The sensor associated with the record may be the sensor that generated the data that is stored in the record. Depending on the embodiment, each table 280 may be associated with a different sensor and/or vehicle system. The integration module 235 may add the records to each table 280 according to the time series associated the records in the combined dataset 270.

At 340, the primitive module 245 may, for each table 280 of the plurality of tables 280, segment the table 280 into a plurality of traffic primitives 285. Each traffic primitive 285 may include one or more records from a table 280 from a same time series. Each traffic primitive 285 may correspond to a basic or fundamental driving action such as braking, accelerating, etc. Depending on the embodiment, the primitive module 245 may segment each table into traffic primitives 285 using a Bayesian non-parametric learning method such as a sticky HDP-HMM method. Other methods may be used.

Depending on the embodiment, the primitive module 245 may further group the traffic primitives 285 into one or more scenarios 287 that correspond to more complex diving actions such as changing lanes or turning at an intersection. The primitive module 245 may use the traffic primitives 285 and/or scenarios 287 to generate a primitive index.

Figure 4:
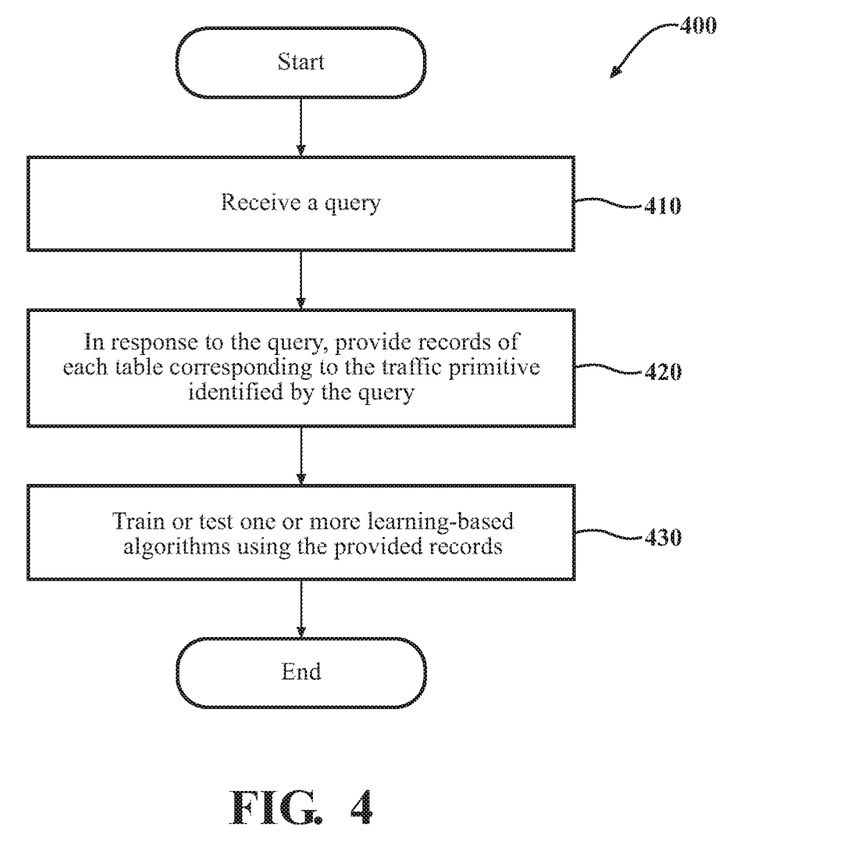
FIG. 4 illustrates a flowchart of a method that is associated with testing or training one or more learning-based algorithms using records from a plurality of datasets.

Additional aspects of the dataset unification system 170 will be discussed in relation to FIG. 4. FIG. 4 illustrates a flowchart of a method 400 that is associated with testing or training one or more learning-based algorithms using records from a plurality of datasets 260. The method 400 will be discussed from the perspective of the dataset unification system 170 of FIGS. 1 and 2.

should be appreciated that the method 400 is not limited to being implemented within the dataset unification system 170 but is instead one example of a system that may implement the method 400.

At 410, the query module 255 may receive a query 290. The query 290 may identify a one or more traffic primitives 285 or one or more scenarios 287. Depending on the embodiment, the query 290 may further identify one or more sensors. The query 290 may be a request to receive records from the tables 280 and/or the combined dataset 270. The records may be for an entity to train or test one or more learning-based algorithms for use in one or more autonomous vehicles 100.

At 420, the query module 255 may, in response to the query 290, provide records from each table 280 that correspond to the one or more traffic primitives 285 identified by the query 290. Depending on the embodiment, the query module 255 may determine the records in each table that correspond to the one or more traffic primitives 285 using the primitives index. The primitives index may be an index that includes an entry for each traffic primitive 285 with a pointer to every record in every table 280 that is associated with the traffic primitive 285. The primitives index may further include entries for each scenario 287 and each sensor. The query module 255 may provide the records as the results 295 to the entity that provided the original query 290 at 410.

At 430, the entity may use the records of the results 295 to train or test one or more learning-based algorithms. The learning-based algorithms may be used by the autonomous vehicle 100 systems. For example, the learning-based algorithms may be used for autonomous vehicle navigation or object avoidance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the dataset unification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the dataset unification system 170, and/or the autonomous driving module(s) 160 may control some or all of these vehicle systems 140 and, thus, may be partially or fully autonomous.

The processor(s) 110, the dataset unification system 170, and/or the autonomous driving module(s) 160 can be operatively connected to communicate with the various vehicle systems 140 and/or individual components thereof. For example, returning to FIG. 1, the processor(s) 110, the dataset unification system 170, and/or the autonomous driving module(s) 160 can be in communication to send and/or receive information from the various vehicle systems 140 to control the movement, speed, maneuvering, heading, direction, etc. of the vehicle 100. The processor(s) 110, the dataset unification system 170, and/or the autonomous driving module(s) 160 may control some or all of these vehicle systems 140.

The processor(s) 110, the dataset unification system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the dataset unification system 170, and/or the autonomous driving module(s) 160 can control the direction and/or speed of the vehicle 100. The processor(s) 110, the dataset unification system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the dataset unification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

What is claimed is:

1. A system for unifying heterogeneous datasets using traffic primitives, the system comprising:
   one or more processors;
   a memory communicably coupled to the one or more processors and storing:
      a preprocessing module including instructions that when executed by the one or more processors cause the one or more processors to:
         receive a plurality of datasets, wherein each dataset is associated with a plurality of records, and each record is associated with a time and a sensor of a plurality of sensors; and
         combine the records of the received plurality of datasets into a combined dataset based on the time associated with each record;
      an integration module including instructions that when executed by the one or more processors cause the one or more processors to:
         for each record of the combined dataset, add the record to a table of a plurality of tables based on the sensor associated with the record, wherein each table of the plurality of tables corresponds to a different sensor of the plurality of sensors;
      a primitive module including instructions that when executed by the one or more processors cause the one or more processors to:
         for each table of the plurality of tables, segment the records of the table into a plurality of traffic primitives; and
      a query module including instructions that when executed by the one or more processors cause the one or more processors to:
         receive a query, the query identifying at least one traffic primitive of the plurality of traffic primitives; and
         in response to the query, provide records of each table corresponding to the at least one traffic primitive identified by the query.

2. The system of claim 1, wherein the primitive module segments the records of the table into the plurality of traffic primitives using non-parametric Bayesian learning.

3. The system of claim 1, wherein the primitive module segments the records of the table into the plurality of traffic primitives using hidden Markov models.

4. The system of claim 1, wherein the query identifies at least one sensor of the plurality of sensors, and the query module further includes instructions to:
   in response to the query, provide records of each table corresponding to the traffic primitive identified by the query and the at least one sensor identified by the query.

5. The system of claim 1, wherein each record of the plurality of datasets was collected by one or more autonomous vehicles.

6. The system of claim 1, wherein the primitive module further includes instructions to:
   cluster the traffic primitives of the plurality of traffic primitives based on statistical similarities among the traffic primitives of the plurality of traffic primitives.

7. The system of claim 1, wherein the primitive module further includes instructions to associate some of the traffic primitives of the plurality of traffic primitives with one or more scenarios of a plurality of scenarios.

8. The system of claim 7, wherein the scenarios of the plurality of scenarios comprise one or more of changing lanes, entering an intersection, exiting an intersection, exiting a roadway, entering a roadway, merging into traffic, turning across traffic, and parking.

9. The system of claim 7, wherein the query identifies a scenario of the plurality of scenarios, and wherein the query module further includes instructions to:
   in response to the query, provide records of each table corresponding to the traffic primitives associated with the identified scenario.

10. The system of claim 1, wherein the sensors of the plurality of sensors comprise one or more of image sensors, LiDAR sensors, and RADAR sensors.

11. A method for unifying heterogeneous datasets using traffic primitives, the method comprising:
   receiving a plurality of datasets, wherein each dataset is associated with a plurality of records, and each record is associated with a time and a sensor of a plurality of sensors;
   combining the records of the received plurality of datasets into a combined data set based on the time associated with each record;
   for each record of the combined dataset, adding the record to a table of a plurality of tables based on the sensor associated with the record, wherein each table of the plurality of tables corresponds to a different sensor of the plurality of sensors;
   for each table of the plurality of tables, segmenting the records of the table into a plurality of traffic primitives;
   receiving a query, the query identifying at least one traffic primitive of the plurality of traffic primitives;
   in response to the query, providing records of each table corresponding to the traffic primitive identified by the query; and
   testing or training one or more learning-based algorithms using the provided records.

12. The method of claim 11, further comprising segmenting the records of the table into the plurality of traffic primitives using non-parametric Bayesian learning.

13. The method of claim 11, further comprising segmenting the records of the table into the plurality of traffic primitives using hidden Markov models.

14. The method of claim 11, wherein the query identifies at least one sensor, and further comprising:
   in response to the query, providing records of each table corresponding to the traffic primitive identified by the query and the at least one sensor identified by the query.

15. The method of claim 11, wherein each record of the plurality of datasets was collected by one or more autonomous vehicles.

16. The method of claim 11, further comprising:

clustering the traffic primitives of the plurality of traffic primitives based on statistical similarities among the traffic primitives of the plurality of traffic primitives.

17. The method of claim 11, further comprising associating some of the traffic primitives of the plurality of traffic primitives with one or more scenarios of a plurality of scenarios.

18. The method of claim 17, wherein the scenarios of the plurality of scenarios comprise one or more of changing lanes, entering an intersection, exiting an intersection, exiting a roadway, entering a roadway, merging into traffic, turning across traffic, and parking.

19. A non-transitory computer-readable medium for unifying heterogeneous datasets using traffic primitives and including instructions that when executed by one or more processors cause the one or more processors to:

receive a plurality of datasets, wherein each dataset is associated with a plurality of records, and each record is associated with a time and a sensor of a plurality of sensors;

combine the records of the received plurality of datasets into a combined data set based on the time associated with each record;

for each record of the combined dataset, add the record to a table of a plurality of tables based on the sensor associated with the record, wherein each table of the plurality of tables corresponds to a different sensor of the plurality of sensors;

for each table of the plurality of tables, segment the records of the table into a plurality of traffic primitives;

receive a query, the query identifying at least one traffic primitive of the plurality of traffic primitives;

in response to the query, provide records of each table corresponding to the traffic primitive identified by the query; and test or train one or more learning-based algorithms using the provided records.

20. The non-transitory computer-readable medium of claim 19, further including instructions that when executed by one or more processors cause the one or more processors to segment the records of the table into the plurality of traffic primitives using non-parametric Bayesian learning.

* * * * *